(12) United States Patent
Umezawa

(10) Patent No.: US 8,976,399 B2
(45) Date of Patent: Mar. 10, 2015

(54) IMAGE FORMING APPARATUS AND IMAGE FORMING METHOD FOR DETERMINING WHETHER OR NOT PAPER SHEETS HAVE BEEN COLLECTED FROM A PAPER SHEET DISCHARGE PORTION

(71) Applicant: KYOCERA Document Solutions Inc., Osaka-shi, Osaka (JP)

(72) Inventor: Hideo Umezawa, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/137,726

(22) Filed: Dec. 20, 2013

(65) Prior Publication Data

US 2014/0176999 A1   Jun. 26, 2014

(30) Foreign Application Priority Data

Dec. 26, 2012  (JP) ................................ 2012-282824

(51) Int. Cl.
*G06F 3/12* (2006.01)
(52) U.S. Cl.
CPC .................................. *G06F 3/1296* (2013.01)
USPC ........................ 358/1.15; 358/1.14; 358/1.16
(58) Field of Classification Search
CPC .................................................... G06F 3/1296
USPC ................................................ 358/1.14–1.16
See application file for complete search history.

(56) References Cited

U.S. PATENT DOCUMENTS

| | | | | |
|---|---|---|---|---|
| 7,757,166 B2* | 7/2010 | Nelson et al. | ............... | 715/243 |
| 2006/0050291 A1* | 3/2006 | Morikawa et al. | ........... | 358/1.13 |
| 2008/0074698 A1* | 3/2008 | Richter et al. | ................ | 358/1.15 |
| 2008/0170256 A1* | 7/2008 | Matsuhara et al. | .......... | 358/1.15 |
| 2008/0192289 A1* | 8/2008 | Honda et al. | ................ | 358/1.15 |
| 2008/0259386 A1* | 10/2008 | Fujino | ......................... | 358/1.15 |
| 2009/0002733 A1* | 1/2009 | Kakigi | ........................... | 358/1.9 |
| 2009/0021783 A1* | 1/2009 | Hosokawa | .................. | 358/1.15 |
| 2010/0214585 A1* | 8/2010 | Tanji | ............................ | 358/1.12 |
| 2010/0231390 A1* | 9/2010 | Hashimoto | ................ | 340/573.1 |
| 2010/0265529 A1* | 10/2010 | Katano | ......................... | 358/1.14 |
| 2012/0045242 A1* | 2/2012 | Yamada | ......................... | 399/85 |
| 2012/0250059 A1* | 10/2012 | Itogawa et al. | ............. | 358/1.13 |
| 2013/0128298 A1* | 5/2013 | Yamada | ...................... | 358/1.13 |

FOREIGN PATENT DOCUMENTS

JP    2006180397 A    7/2006

* cited by examiner

*Primary Examiner* — Benny Q Tieu
*Assistant Examiner* — Quyen V Ngo
(74) *Attorney, Agent, or Firm* — Alleman Hall McCoy Russell & Tuttle LLP

(57) ABSTRACT

An image forming apparatus is connected to a plurality of external apparatuses. A job reception portion receives from each of the external apparatuses request to execute print job for forming image on paper sheet. A print control portion causes image forming portion to form image on paper sheet based on the print job received by the job reception portion, and causes discharge portion to discharge to paper sheet discharge portion the paper sheet on which the image has been formed by the image forming portion based on the print job. A collection determination portion, after the person detection portion has detected the presence of person, when person detection portion has not detected the presence of person and discharge detection portion has not detected the presence of paper sheet, determines that all paper sheets discharged to the paper sheet discharge portion have been collected.

8 Claims, 8 Drawing Sheets

Fig. 5

| No. | END DATE AND TIME | FUNCTION | JOB NAME | IMAGE DATA | |
|---|---|---|---|---|---|
| | | JOB IDENTIFICATION INFORMATION | | | |
| 1 | 10/10 10:10 | PRINT | documentA ~J1 | 0x····· ~D1 | } H1 |
| 2 | 10/10 10:15 | PRINT | graphX ~J2 | 0x····· ~D2 | } H2 |
| 3 | 10/10 10:20 | FACSIMILE RECEPTION | 06-1234-56XX ~J3 | 0x····· ~D3 | } H3 |
| 4 | 10/10 10:25 | PRINT | documentB ~J4 | 0x····· ~D4 | } H4 |
| 5 | 10/10 10:30 | PRINT | imageY ~J5 | 0x····· ~D5 | } H5 |

Fig. 7

| PRINT JOB HISTORY INFORMATION | | | | |
|---|---|---|---|---|
| | | JOB IDENTIFICATION INFORMATION | | |
| No. | END DATE AND TIME | FUNCTION | JOB NAME | |
| 1 | 10/10 10:10 | PRINT | documentA | J1 |
| 2 | 10/10 10:15 | PRINT | graphX | J2 |
| 3 | 10/10 10:20 | FACSIMILE RECEPTION | 06-1234-56XX | J3 |
| 4 | 10/10 10:25 | PRINT | documentB | J4 |
| 5 | 10/10 10:30 | PRINT | imageY | J5 |

PREVIEW

DELETE — K1
CLOSE — K2

Fig. 8

| PRINT JOB HISTORY INFORMATION | | | | |
|---|---|---|---|---|
| | JOB IDENTIFICATION INFORMATION | | | |
| | No. | END DATE AND TIME | FUNCTION | JOB NAME |
| | 1 | 10/10 10:10 | PRINT | documentA |
| | 3 | 10/10 10:20 | FACSIMILE RECEPTION | 06-1234-56XX |
| | 4 | 10/10 10:25 | PRINT | documentB |
| | 5 | 10/10 10:30 | PRINT | imageY |

PREVIEW

DELETE   CLOSE

IMAGE FORMING APPARATUS AND IMAGE FORMING METHOD FOR DETERMINING WHETHER OR NOT PAPER SHEETS HAVE BEEN COLLECTED FROM A PAPER SHEET DISCHARGE PORTION

INCORPORATION BY REFERENCE

This application is based upon and claims the benefit of priority from the corresponding Japanese Patent Application No. 2012-282824 filed on Dec. 26, 2012, the entire contents of which are incorporated herein by reference.

BACKGROUND

The present disclosure relates to an image forming apparatus connected to a plurality of external apparatuses, and an image forming method to be executed by an image forming apparatus, and in particular, relates to a technique for determining whether or not all paper sheets have been collected from a paper sheet discharge portion.

Conventionally, an image forming apparatus is known that is connected to a plurality of external apparatuses such as personal computers. When an instruction has been input from each of the external apparatuses to execute a print job for forming an image on a paper sheet, the image forming apparatus forms an image on a paper sheet based on the print job for which the instruction has been given. Then, the image forming apparatus discharges the paper sheet on which the image has been formed to a paper sheet discharge portion such as a discharge tray or a finisher.

In the case of such an image forming apparatus, a plurality of paper sheets discharged to the paper sheet discharge portion as a result of the execution of a plurality of print jobs may be left in the paper sheet discharge portion without being picked up by users. In this case, when each of the users comes to the image forming apparatus to pick up paper sheets later, the user needs to sort, from the plurality of paper sheets remaining in the paper sheet discharge portion, the paper sheets related to the print job executed by the user themselves, which may be cumbersome to the user.

In response, for example, a technique is known for: when having detected the discharge of a paper sheet to a paper sheet discharge tray (a paper sheet discharge portion), turning on an information lamp indicating the presence of a paper sheet; and when having detected the removal of the paper sheet from the paper sheet discharge tray, determining that the paper sheet has been collected and turning off the information lamp.

SUMMARY

An image forming apparatus according to an aspect of the present disclosure is connected to a plurality of external apparatuses, and includes a job reception portion, an image forming portion, a paper sheet discharge portion, a discharge portion, a print control portion, a discharge detection portion, a person detection portion, and a collection determination portion. The job reception portion receives from each of the external apparatuses a request to execute a print job for forming an image on a paper sheet. The image forming portion forms an image on a paper sheet. To the paper sheet discharge portion, a paper sheet on which an image has been formed by the image forming portion is discharged. The discharge portion discharges to the paper sheet discharge portion a paper sheet on which an image has been formed by the image forming portion. The print control portion performs a printing process for causing the image forming portion to form an image on a paper sheet based on the print job received by the job reception portion, and causing the discharge portion to discharge to the paper sheet discharge portion the paper sheet on which the image has been formed by the image forming portion based on the print job. The discharge detection portion detects presence or absence of a paper sheet in the paper sheet discharge portion. The person detection portion detects presence or absence of a person within a predetermined distance from the image forming apparatus. The collection determination portion, after the person detection portion has detected the presence of a person, when the person detection portion has not detected the presence of a person and the discharge detection portion has not detected the presence of a paper sheet, determines that all paper sheets discharged to the paper sheet discharge portion have been collected.

An image forming method according to another aspect of the present disclosure is executed by an image forming apparatus connected to a plurality of external apparatuses, the image forming apparatus including a job reception portion, an image forming portion, a paper sheet discharge portion, a discharge portion, a person detection portion, and a discharge detection portion. The job reception portion receives from each of the external apparatuses a request to execute a print job for forming an image on a paper sheet. The image forming portion forms an image on a paper sheet. To the paper sheet discharge portion, a paper sheet on which an image has been formed by the image forming portion is discharged. The discharge portion discharges to the paper sheet discharge portion a paper sheet on which an image has been formed by the image forming portion. The person detection portion detects presence or absence of a person within a predetermined distance from the image forming apparatus. The discharge detection portion detects presence or absence of a paper sheet in the paper sheet discharge portion. The image forming method includes: a step of performing a printing process for causing the image forming portion to form an image on a paper sheet based on the print job received by the job reception portion, and causing the discharge portion to discharge to the paper sheet discharge portion the paper sheet on which the image has been formed by the image forming portion based on the print job; and a step of, after the person detection portion has detected the presence of a person, when the person detection portion has not detected the presence of a person and the discharge detection portion has not detected the presence of a paper sheet, determining that all paper sheets discharged to the paper sheet discharge portion have been collected.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a diagram showing an example of job history information stored in a storage portion of the multifunction peripheral shown in FIG. 1.

FIG. 7 is a diagram showing a screen displayed on a display portion by a history display process performed by the multifunction peripheral shown in FIG. 1.

FIG. 8 is a diagram showing an example of the screen displayed on the display portion after job history information including job identification information to be deleted that had been received by a deletion instruction reception portion of the multifunction peripheral shown in FIG. 1 has been deleted from the storage portion.

DETAILED DESCRIPTION

Figure 1:
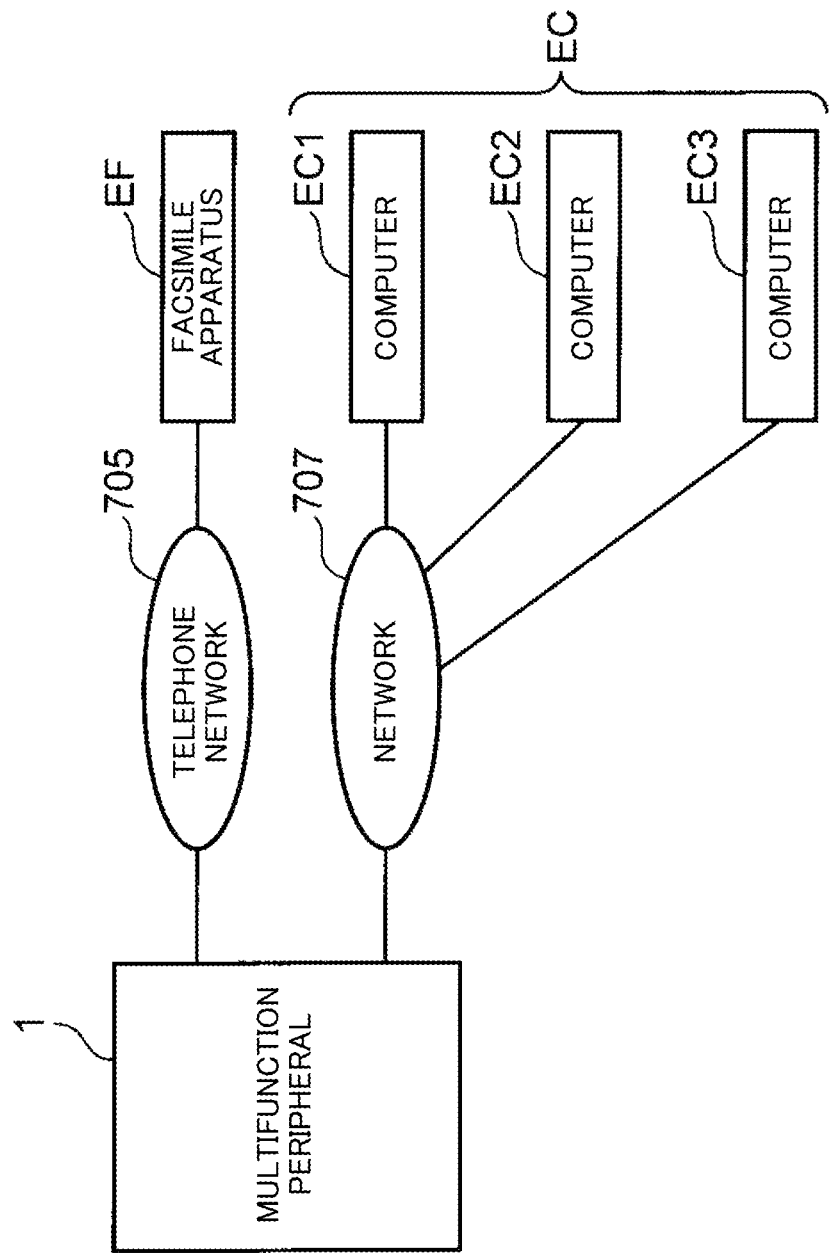
FIG. 1 is a diagram showing examples of a telephone network and a network, which are connected to a multifunction peripheral, which is an example of an image forming apparatus according to the present disclosure.

Hereinafter, embodiments of the present disclosure will be described in detail based on the drawings. FIG. 1 is a diagram showing examples of a telephone network 705 and a network 707, which are connected to a multifunction peripheral 1, which is an example of an image forming apparatus according to the present disclosure.

As shown in FIG. 1, the multifunction peripheral 1, which is an example of the image forming apparatus according to the present disclosure, is connected to the telephone network 705 and the network 707 such as a LAN (Local Area Network) or the Internet. The multifunction peripheral 1 performs facsimile communication with a facsimile apparatus (external apparatus) EF via the telephone network 705. The multifunction peripheral 1 also performs network communication with a plurality of computers (external apparatuses) EC1 to EC3 such as personal computers via the network 707.

It should be noted that there is no intention of limiting the number of facsimile apparatuses connected to the multifunction peripheral 1 via the telephone network 705 to one. Alternatively, a plurality of facsimile apparatuses may be connected to the multifunction peripheral 1 via the telephone network 705. Further, there is no intention of limiting the number of computers connected to the multifunction peripheral 1 via the network 707 to three. Alternatively, one, two, or four or more computers may be connected to the multifunction peripheral 1 via the network 707. Hereinafter, the computers EC1 to EC3 are collectively referred to as a "computer EC".

Figure 2:
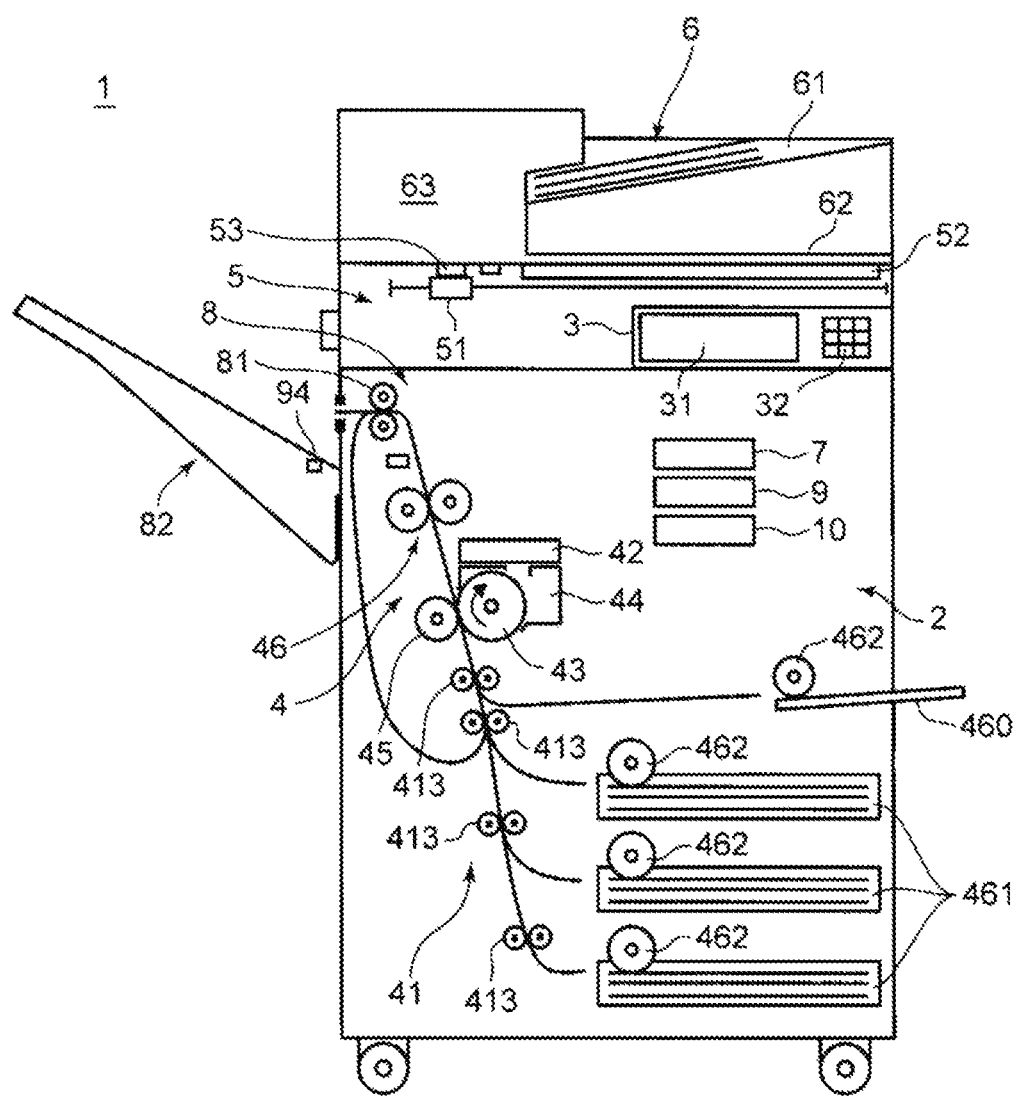
FIG. 2 is a schematic structure diagram of the multifunction peripheral shown in FIG. 1.
Figure 3:
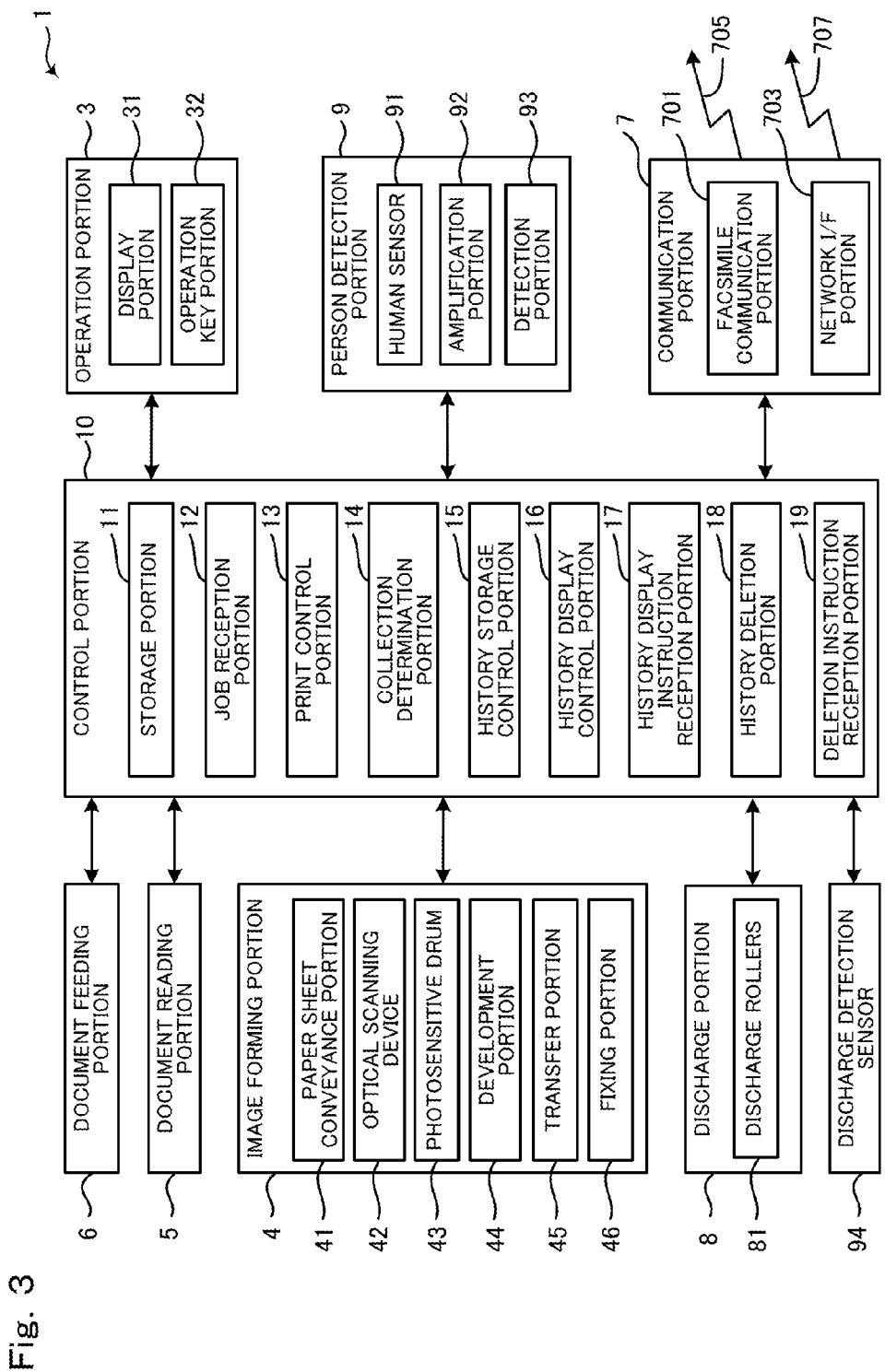
FIG. 3 is a block diagram showing an example of the electrical configuration of the multifunction peripheral shown in FIG. 1.

FIG. 2 is a schematic structure diagram of the multifunction peripheral 1. FIG. 3 is a block diagram showing an example of the electrical configuration of the multifunction peripheral 1. Specifically, as shown in FIG. 2, the multifunction peripheral 1 includes an operation portion 3, a document reading portion 5, a document feeding portion 6, and a main body portion 2.

The operation portion 3 includes: a display portion 31, which displays information; and an operation key portion 32, which allows a user to perform operations of giving various instructions. The display portion 31 is composed, for example, of a liquid crystal display having a touch panel function, or the like. The operation key portion 32 includes various key switches such as a start key for the user to input an instruction to execute printing, for example, and a numerical keypad for the user to input the number of copies to be printed or the like.

The document reading portion 5 includes: a scanner portion 51 having an exposure lamp, a CCD (Charge-Coupled Device), and the like; a document platen 52 composed of a transparent member such as glass; and a document reading slit 53.

The scanner portion 51 is configured to be movable by a driving portion (not shown). When reading a document placed on the document platen 52, the scanner portion 51 is moved along the surface of the document and at a position opposed to the document platen 52, acquires an image while scanning the document, and outputs image data representing the acquired image to a control portion 10 described later. Further, when reading a document fed from the document feeding portion 6, the scanner portion 51 is moved to a position opposed to the document reading slit 53, acquires an image on the document through the document reading slit 53 in synchronization with the operation of conveying the document performed by the document feeding portion 6, and outputs image data of the acquired image to the control portion 10 described later.

The document feeding portion 6 includes: a document placement portion 61, on which documents are placed; a document discharge portion 62 for discharging thereto a document from which an image has already been read; and a document conveyance mechanism 63, which sends out documents placed on the document placement portion 61 one by one to convey the document to a position opposed to the document reading slit 53, and discharges the document to the document discharge portion 62.

The main body portion 2 includes a manual bypass tray 460, a plurality of paper sheet feeding cassettes 461, a plurality of paper sheet feeding rollers 462, an image forming portion 4, a discharge portion 8, a communication portion 7, a person detection portion 9, a discharge detection sensor (discharge detection portion) 94, and the control portion 10.

The paper sheet feeding rollers 462 pull out a paper sheet from the manual bypass tray 460 on which paper sheets are placed or from the paper sheet feeding cassettes 461 in which paper sheets are accommodated, and the paper sheet feeding rollers 462 convey the paper sheet to the image forming portion 4.

The image forming portion 4 includes a paper sheet conveyance portion 41, an optical scanning device 42, a photosensitive drum 43, a development portion 44, a transfer portion 45, and a fixing portion 46.

The paper sheet conveyance portion 41 includes a plurality of conveyance rollers 413. The conveyance rollers 413 supply to the photosensitive drum 43 a paper sheet conveyed from each of the paper sheet feeding rollers 462.

Under the control of the control portion 10, the optical scanning device 42 outputs laser light based on image data input to the control portion 10, and scans the photosensitive drum 43 with the laser light, thereby forming an electrostatic latent image on the photosensitive drum 43.

The development portion 44 applies toner onto an electrostatic latent image on the photosensitive drum 43, thereby forming a toner image. The transfer portion 45 transfers the toner image on the photosensitive drum 43 to a paper sheet. The fixing portion 46 heats the paper sheet to which the toner image has been transferred, thereby fixing the toner image on the paper sheet.

The discharge portion 8 includes discharge rollers 81 and a discharge tray (paper sheet discharge portion) 82. The discharge rollers 81 discharge to the discharge tray 82 a paper sheet on which an image has been formed by the image forming portion 4.

As shown in FIG. 3, the communication portion 7 includes a facsimile communication portion 701 and a network I/F portion 703. The facsimile communication portion 701 is connected to the telephone network 705. The facsimile communication portion 701 includes: an NCU (Network Control Unit), which controls the connection of a telephone line with the facsimile apparatus EF of a communication partner; and a modulation/demodulation circuit, which modulates and demodulates a signal for facsimile communication.

The network I/F portion 703 is connected to the LAN (Local Area Network) 707. The network I/F portion 703 is a communication interface circuit that executes communication with the computer EC (FIG. 1) connected to the LAN 707.

The discharge detection sensor 94 is provided on the underside of the discharge tray 82 and detects the presence or absence of a paper sheet in the discharge tray 82. Specifically, the discharge detection sensor 94 is composed, for example, of a reflective photosensor having a light-emitting device and a light-receiving device. When light output from the light-emitting device has been reflected by a paper sheet and received by the light-receiving device, the discharge detection sensor 94 outputs a detection signal indicating the presence of a paper sheet to the control portion 10. When, on the other hand, light output from the light-emitting device has not been reflected and therefore has not been received by the light-receiving device, the discharge detection sensor 94 outputs a detection signal indicating the absence of a paper sheet to the control portion 10.

It should be noted that there is no intention of limiting the discharge detection sensor 94 to the above. Alternatively, for example, the discharge detection sensor 94 may be a mechanical sensor that, for example, detects the presence of a paper sheet based on the fact that a projection biased upward by a spring or the like provided on the underside of the discharge tray 82 has come into contact with a document and moved downward.

The person detection portion 9 is provided on the front surface of the main body portion 2 (the front side of the paper plane in FIG. 2) or the like and detects infrared light of a specific wavelength emitted from a human body, thereby detecting the presence or absence of a person within a predetermined distance from the multifunction peripheral 1. Specifically, as shown in FIG. 3, the person detection portion 9 includes a human sensor 91, an amplification portion 92, and a detection portion 93.

The human sensor 91 is, for example, a pyroelectric infrared sensor, which detects infrared light emitted from a human body, using a pyroelectric effect, and outputs voltage corresponding to the intensity of the infrared light. The human sensor 91 includes a filter to detect only infrared light of a specific wavelength emitted from a human body, without reacting to light such as sunlight and fluorescent light. It should be noted that there is no intention of limiting the human sensor 91 to a pyroelectric infrared sensor. Alternatively, the human sensor 91 may be composed, for example, of an infrared sensor that detects infrared light emitted from a human body, using a thermoelectric effect or a photoelectric effect.

The amplification portion 92 amplifies by a predetermined amplification factor a signal representing the voltage output from the human sensor 91. The detection portion 93 compares the voltage represented by the signal input from the amplification portion 92 with a reference voltage determined in advance. Then, when the voltage represented by the input signal exceeds the reference voltage, the detection portion 93 outputs a detection signal indicating the presence of a person to the control portion 10. The detection range in which the person detection portion 9 detects a person (the distance from the multifunction peripheral 1) is adjusted by the amplification factor used by the amplification portion 92.

The control portion 10 governs the operation of the entirety of the multifunction peripheral 1. The control portion 10 includes, for example: a CPU (Central Processing Unit), which executes predetermined arithmetic processing; a non-volatile memory such as an EEPROM (Electrically Erasable and Programmable Read-Only Memory), in which a predetermined control program is stored; a RAM (Random-Access Memory), which temporarily stores data; peripheral circuits of these; and the like.

The control portion 10 uses a part of the storage area of the RAM as a storage portion 11. Further, the control portion 10 executes the control program stored in the non-volatile memory, thereby functioning as a job reception portion 12, a print control portion 13, a collection determination portion 14, a history storage control portion 15, a history display control portion 16, a history display instruction reception portion 17, a history deletion portion 18, and a deletion instruction reception portion 19.

The job reception portion 12 receives a print job execution request received from the facsimile apparatus EF or the computer EC by the communication portion 7. A print job is a job for forming an image on a paper sheet. A signal representing a print job execution request transmitted from the facsimile apparatus EF includes, for example, image data representing an image to be formed on a paper sheet, and a signal representing information indicating the telephone number of the facsimile transmission source, and the like. Further, a signal representing a print job execution request transmitted from the computer EC includes, for example, image data representing an image to be formed on a paper sheet, and a signal representing identification information (for example, an IP address, a computer name, or the like) identifying the computer EC, information indicating the file name of the image to be formed on a paper sheet, and the like.

When the job reception portion 12 has received a print job execution request, the print control portion 13 performs a printing process, which is the process of causing the image forming portion 4 to form an image on a paper sheet based on the received print job, and causing the discharge portion 8 to discharge to the discharge tray 82 the paper sheet on which the image forming portion 4 has formed the image.

Specifically, when a print job execution request transmitted from the facsimile apparatus EF has been received, the print control portion 13 performs the printing process as the operation of a facsimile reception function of the multifunction peripheral 1. When performing the printing process as the operation of the facsimile reception function, the print control portion 13 causes the image forming portion 4 to form on a paper sheet the image represented by the image data included in the signal representing the print job execution request received by the job reception portion 12, and causes the discharge portion 8 to discharge to the discharge tray 82 the paper sheet on which the image has been formed.

When, on the other hand, a print job execution request has been received from the computer EC, the print control portion 13 performs the printing process as the operation of a print function of the multifunction peripheral 1. When performing the printing process as the operation of the print function, the print control portion 13 causes the image forming portion 4 to form on a paper sheet the image represented by the image data included in the signal representing the print job execution request received by the job reception portion 12, and causes the discharge portion 8 to discharge to the discharge tray 82 the paper sheet on which the image has been formed.

Hereinafter, a description is given of the operation of, after a plurality of paper sheets have been discharged to the discharge tray 82 as a result of the printing process performed based on a plurality of print jobs, determining whether or not all the paper sheets have been collected from the discharge tray 82. Then, in the description, detailed descriptions are given of the collection determination portion 14, the history storage control portion 15, the history display control portion 16, the history display instruction reception portion 17, the history deletion portion 18, and the deletion instruction reception portion 19.

Figure 4:
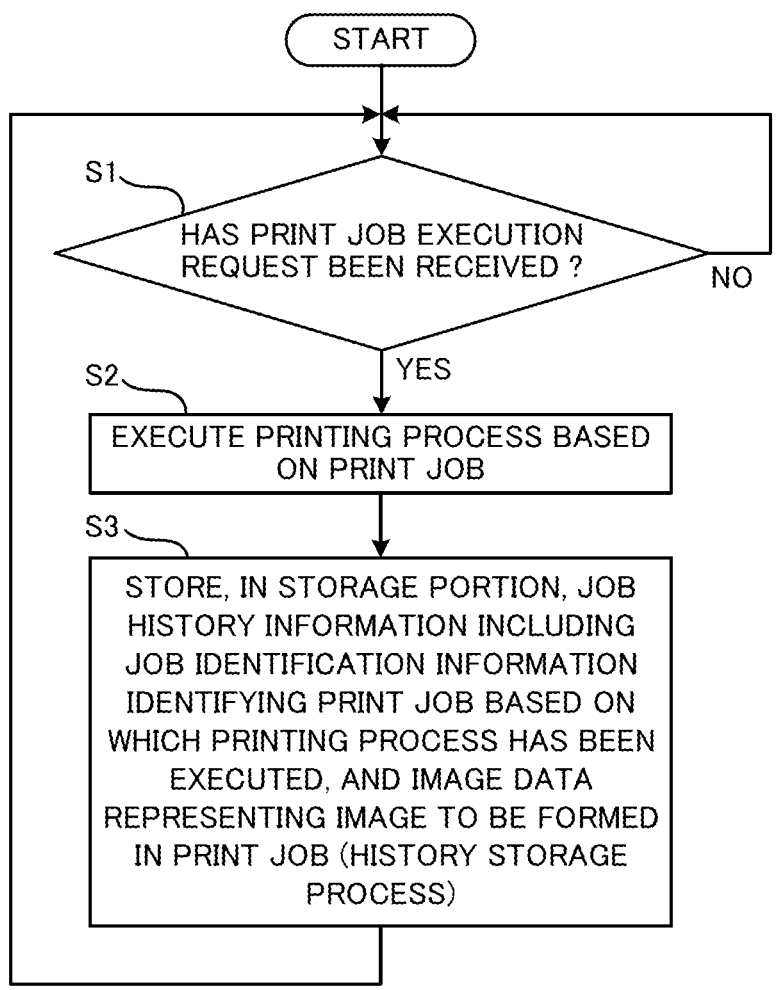
FIG. 4 is a flow chart showing an example of the operation of a history storage process performed by the multifunction peripheral shown in FIG. 1.

FIG. 4 is a flow chart showing an example of the operation of a history storage process. For example, as shown in FIG. 4, when the job reception portion 12 has received a print job execution request (S1; YES), the print control portion 13 executes the printing process based on the received print job (S2). Then, the history storage control portion 15 performs a history storage process, which is the process of storing, in the storage portion 11, job history information including: job identification information, which is information identifying the print job based on which the print control portion 13 has performed the printing process; and image data representing an image to be formed on a paper sheet in the print job based on which the printing process has been performed (S3).

Specifically, in the history storage process in step S3, for example, the history storage control portion 15 stores, in the storage portion 11, job history information including: job identification information including information indicating the position in order at which the printing process has been executed, information indicating the date and time when the printing process has ended, information indicating whether the printing process has been performed as the operation of the facsimile reception function or the print function, and information indicating the name of the print job; and image data representing an image formed on a paper sheet. It should be noted that there is no intention of limiting the information included in the job identification information to the above five pieces of information. Alternatively, for example, the job identification information may include information included in the signal representing the print job execution request and different from the above five pieces of information, or may not include some of the above five pieces of information.

As described above, every time the job reception portion 12 receives a print job execution request, steps S2 and S3 are performed.

FIG. 5 is a diagram showing an example of job history information stored in the storage portion 11. For example, FIG. 5 shows that the job reception portion 12 has sequentially received five print job execution requests, whereby steps S2 and S3 have been sequentially performed, and as a result, five pieces of job history information H1 to H5 have been stored in the storage portion 11.

For example, the job history information H1 includes: information "1", which indicates the position in order at which the printing process has been executed; information "10/10 10:10", which indicates the date and time when the printing process has ended; information "print", which indicates that the printing process has been performed as the operation of the print function; job identification information J1, which, as information indicating the name of the print job, includes information "document A", which indicates the file name of the image to be formed on a paper sheet, the file name included in the signal representing the print job execution request; and image data D1, which represents the image formed on the paper sheet by the printing process. Thus, the job identification information J1 is associated with the image data D1.

Further, the job history information H3 includes: information "3", which indicates the position in order at which the printing process has been executed; information "10/10 10:20", which indicates the date and time when the printing process has ended; information "facsimile reception", which indicates that the printing process has been performed as the operation of the facsimile reception function; job identification information J3, which, as information indicating the name of the print job, includes information "06-1234-56XX", which indicates the telephone number of the facsimile transmission source, the telephone number included in the signal representing the print job execution request; and image data D3, which represents the image formed on the paper sheet by the printing process. Thus, the job identification information J3 is associated with the image data D3.

Similarly, the job history information H2 includes job identification information J2 and image data D2. The job history information H4 includes job identification information J4 and image data D4. The job history information H5 includes job identification information J5 and image data D5. Thus, the pieces of job identification information J2, J4, and J5 are associated with the pieces of image data D2, D4, and D5, respectively.

Figure 6:
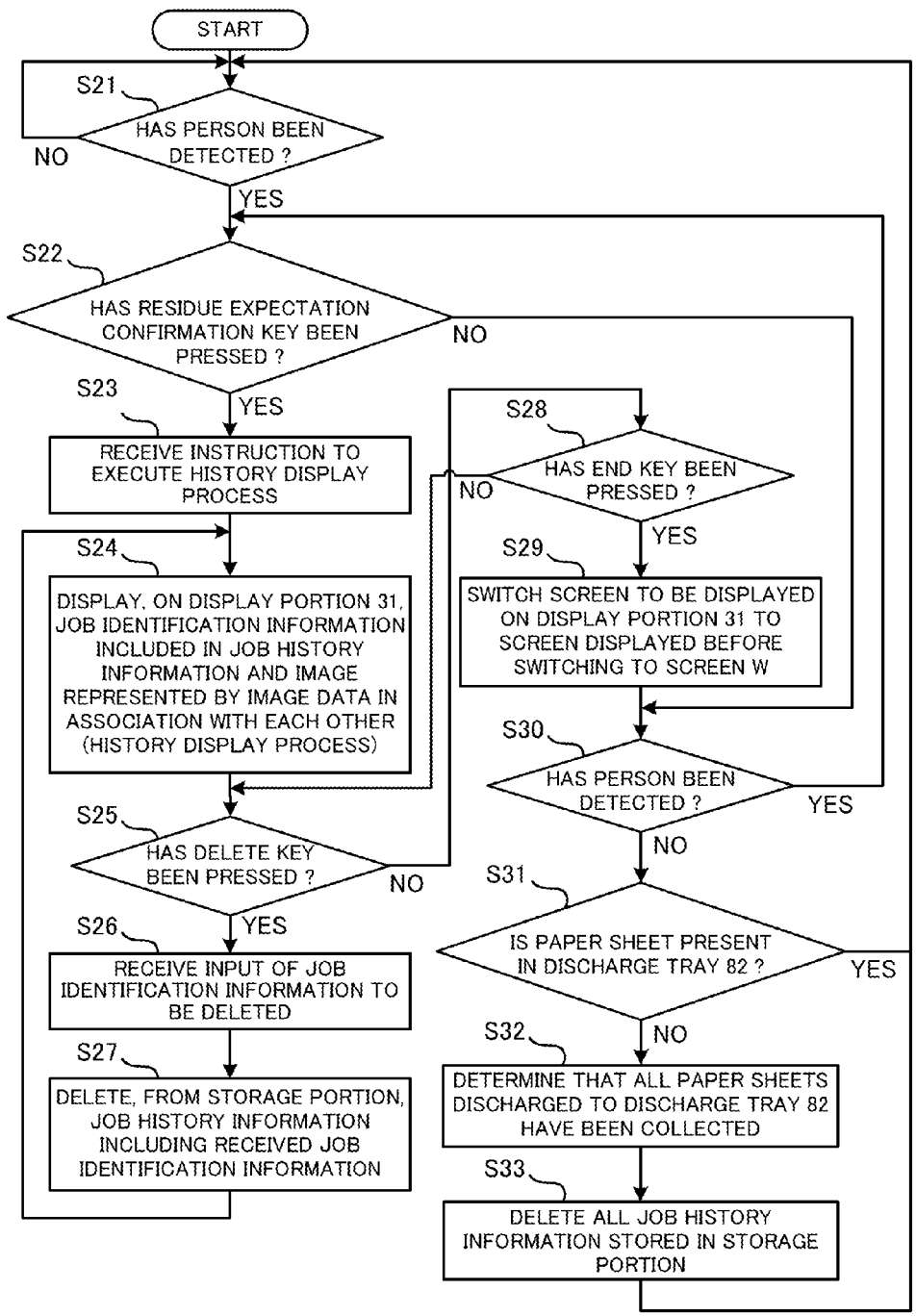
FIG. 6 is a flow chart showing an example of the operation of determining whether or not all paper sheets have been collected from a discharge tray of the multifunction peripheral shown in FIG. 1.

Meanwhile, in parallel with the operation of steps S1 to S3 shown in FIG. 4, the operation is performed of determining whether or not all the paper sheets have been collected from the discharge tray 82. FIG. 6 is a flow chart showing an example of the operation of determining whether or not all the paper sheets have been collected from the discharge tray 82. For example, as shown in FIG. 6, after the person detection portion 9 has detected the presence of a person within the predetermined distance from the multifunction peripheral 1 (S21; YES), if the user has pressed a residue expectation confirmation key, which is a software key (not shown) displayed on the display portion 31 by the control portion 10 (S22; YES), the history display instruction reception portion 17 assumes that an instruction has been input to cause the history display control portion 16 to perform a history display process described later. Then, the history display instruction reception portion 17 receives the instruction (S23).

When the history display instruction reception portion 17 has received the instruction to cause the history display control portion 16 to perform the history display process, the history display control portion 16 performs the history display process for displaying job identification information included in job history information stored in the storage portion 11, and the image represented by the image data included in the job history information including the job identification information, in association with each other on the display portion 31 (S24). The user views the job identification information displayed on the display portion 31, which facilitates the confirmation of which print job has been subjected to the printing process to discharge the paper sheet present in the discharge tray 82. Particularly, the user compares the image displayed in association with the job identification information displayed on the display portion 31, with the paper sheet present in the discharge tray 82, which further facilitates the confirmation of which print job has been executed to discharge the paper sheet present in the discharge tray 82.

FIG. 7 is a diagram showing a screen W displayed on the display portion 31 by the history display process. Specifically, when, in step S24, the pieces of job history information H1 to H5 are stored in the storage portion 11 as shown in FIG.

5, the history display control portion 16 switches, as shown in FIG. 7, the display content of the display portion 31 to the screen W including a display area A1 for displaying job identification information and a display area A2 for displaying an image, and displays in the display area A1 the pieces of job identification information J1 to J5 included in the pieces of job history information H1 to H5, respectively.

Further, the history display control portion 16 displays in the display area A2 the image represented by the image data corresponding to job identification information selected from among the pieces of job identification information J1 to J5 displayed on the screen W. For example, FIG. 7 shows the state where the job identification information J2 has been selected by the user performing a touch operation. In this case, based on the job history information H2 (FIG. 5), the history display control portion 16 displays in the display area A2 the image represented by the image data D2 corresponding to the job identification information J2.

It should be noted that when initially switching the display content of the display portion 31 to the screen W, the history display control portion 16 sets the display content such that the job identification information displayed at the top in the display area A1 (the job identification information J1 in FIG. 7) is selected.

Further, there is no intention of limiting to the above method the method for displaying job identification information and the image represented by the image data in association with each other on the display portion 31 in the history display process. Alternatively, for example, the images represented by the pieces of image data corresponding to pieces of job identification information may be reduced, and the reduced images and the pieces of job identification information may be displayed side by side in a horizontal direction.

Then, when a deletion key K1 has been pressed in the state where any of the pieces of job identification information displayed on the display portion 31 is selected, that is, an instruction has been input to determine the currently selected job identification information as job identification information to be deleted (S25; YES), the deletion instruction reception portion 19 receives the currently selected job identification information as the job identification information to be deleted (S26).

When the deletion instruction reception portion 19 has received the input of the job identification information to be deleted, the history deletion portion 18 deletes, from the storage portion 11, the job history information including the received job identification information (S27), and thereafter causes the history display control portion 16 to execute the history display process (step S24). This allows the user to extract, from the paper sheets present in the discharge tray 82, only a paper sheet related to the print job for which the user themselves has made the execution request; return the remaining paper sheets to the discharge tray 82; thereafter input, as job identification information to be deleted, the job identification information identifying the print job for which the user themselves has made the execution request, thereby deleting from the storage portion 11 the job history information including the job identification information to be deleted, and displaying on the display portion 31 the job identification information included in job history information different from the deleted job history information. Thus, the job identification information of the print job executed to discharge the collected paper sheet is not displayed on the display portion by the history display process. This improves the accuracy of notifying the user of which print job has been executed to discharge the paper sheet present in the discharge tray 82.

FIG. 8 is a diagram showing an example of the screen W displayed on the display portion 31 after the job history information including job identification information to be deleted that had been received by the deletion instruction reception portion 19 has been deleted from the storage portion 11. Specifically, for example, as shown in FIG. 7, when the deletion key K1 has been pressed with the job identification information J2 selected by the user performing a touch operation, then in step S26, the deletion instruction reception portion 19 receives the job identification information J2 as job identification information to be deleted. Then, in step S27, the history deletion portion 18 deletes the job history information H2 (FIG. 5) including the received job identification information J2 from the storage portion 11, and causes the history display control portion 16 to execute the history display process (step S24).

In this case, in step S27, the job history information H2 including the job identification information J2 is deleted from the storage portion 11, and therefore, the pieces of job history information H1 and H3 to H5 are stored in the storage portion 11. Then, in step S24, for example, as shown in FIG. 8, in the display area A1, the pieces of job identification information J1 and J3 to J5 are displayed, which are included in the pieces of job history information H1 and H3 to H5, respectively, stored in the storage portion 11, and the job identification information J1 displayed at the top in the display area A1 is selected. Then, in the display area A2, the image data D1 is displayed, which is included in the job history information H1 including the currently selected job identification information J1.

On the other hand, when the deletion key K1 has not been pressed (S25; NO) and an end key K2 (FIGS. 7 and 8) has been pressed (S28; YES), the history display control portion 16 switches the screen to be displayed on the display portion 31 from the screen W to the screen displayed before the switching to the screen W (S29).

Then, after the display content of the display portion 31 has been switched to the screen displayed before the switching to the screen W (S29), or after the user has not pressed the residue expectation confirmation key (S22; NO), if the person detection portion 9 has detected the presence of a person within the predetermined distance from the multifunction peripheral 1 (S30; YES), it is considered that after the detection of the presence of a person in step S21, the person (user) is still working in front of the multifunction peripheral 1. Thus, to check the collection of paper sheets by the user again, the collection determination portion 14 shifts the process to step S22.

On the other hand, after the person detection portion 9 has not detected the presence of a person within the predetermined distance from the multifunction peripheral 1 (S30; NO), if the discharge detection sensor 94 has detected the presence of a paper sheet in the discharge tray 82 (S31; YES), it is considered that the person (user) detected in step S21 has moved away from near the multifunction peripheral 1 without collecting all the paper sheets present in the discharge tray 82. Thus, to monitor a person coming close to the multifunction peripheral 1 again, the collection determination portion 14 shifts the process to step S21.

Further, after the person detection portion 9 has not detected the presence of a person within the predetermined distance from the multifunction peripheral 1 (S30; NO), if the discharge detection sensor 94 has detected the absence of paper sheets in the discharge tray 82 (S31; NO), it is considered that the person (user) detected in step S21 has collected the paper sheets from the discharge tray 82 and moved away.

Thus, the collection determination portion 14 determines that all the paper sheets discharged to the discharge tray 82 have been collected (S32).

When, in step S32, the collection determination portion 14 has determined that all the paper sheets discharged to the discharge tray 82 have been collected, the history deletion portion 18 deletes all the job history information stored in the storage portion 11 (S33), and shifts the process to step S21.

As described above, according to the configuration of the above embodiment, when the user has come close to the multifunction peripheral 1, the person detection portion 9 detects the presence of a person. Then, when the user has extracted some of the paper sheets in the discharge tray 82, returned the remaining paper sheets to the discharge tray 82, and moved away from the multifunction peripheral 1, the person detection portion 9 does not detect the presence of a person, and the discharge detection sensor 94 detects the presence of a paper sheet in the discharge tray 82. When, on the other hand, the user has collected all the paper sheets in the discharge tray 82 and moved away from the multifunction peripheral 1, the person detection portion 9 does not detect the presence of a person, and the discharge detection sensor 94 does not detect the presence of a paper sheet in the discharge tray 82.

As described above, according to the configuration of the above embodiment, after the person detection portion 9 has detected the presence of a person, if the person detection portion 9 has not detected the presence of a person and the discharge detection sensor 94 has not detected the presence of a paper sheet in the discharge tray 82, it is determined that all the paper sheets present in the discharge tray 82 have been collected. This makes it possible to improve the accuracy of determining whether or not all the paper sheets have been collected from the discharge tray 82.

Meanwhile, conventionally, a technique is known for: when having detected the discharge of a paper sheet to a paper sheet discharge tray (a paper sheet discharge portion), turning on an information lamp indicating the presence of a paper sheet; and when having detected the removal of the paper sheet from the paper sheet discharge tray, determining that the paper sheet has been collected and turning off the information lamp. In the case, however, of using such a technique, if a user has once removed all the paper sheets in the paper sheet discharge portion, extracted some of the paper sheets, and returned the remaining paper sheets to the paper sheet discharge portion, it is incorrectly determined that the paper sheets have been collected when the user has once removed the paper sheets, and the information lamp is turned off. Thus, to turn on the information lamp indicating the presence of a paper sheet in the paper sheet discharge portion, it is necessary to perform the operation of pressing a switch for turning on the information lamp, which is inconvenient. In contrast, the multifunction peripheral 1 according to the embodiment of the present disclosure can improve the accuracy of determining whether or not all the paper sheets have been collected from the paper sheet discharge portion.

It should be noted that the configurations shown in FIGS. 1 to 8 in the above embodiment are merely illustrative, and there is no intention of limiting the present disclosure to the embodiment.

For example, in the history storage process in step S3, the configuration may be so simplified that image data representing an image to be formed in the print job is not included in job history information. Accordingly, the configuration may be so simplified that the display area A2 is not provided in the screen W (FIG. 7) displayed in the history display process in step S24 (FIG. 6) so that only the job identification information included in the job history information is displayed in the display area A1.

Further, the configuration of the control portion 10 may be so simplified as not to function as the deletion instruction reception portion 19. Accordingly, the configuration may be such that steps S25 to S27 (FIG. 6) are not executed, and after the execution of step S24 (FIG. 6), step S28 (FIG. 6) is executed.

Further, the configuration of the control portion 10 may be so simplified as not to function as the history storage control portion 15, the history display control portion 16, the history display instruction reception portion 17, and the history deletion portion 18. Accordingly, the configuration may be such that steps S22 to S29 (FIG. 6) and step S33 are not executed, and when, in step S21 (FIG. 6), the person detection portion 9 has detected the presence of a person within the predetermined distance from the multifunction peripheral 1, the process shifts to step S30 (FIG. 6).

Further, the image forming apparatus according to the present disclosure can be applied to, as well as the multifunction peripheral 1 described above, a printer apparatus that performs the printing process based on a print job execution request transmitted from the computer EC, and an image forming apparatus such as a facsimile apparatus that performs the printing process based on a print job execution request transmitted from the facsimile apparatus EF.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus connected to a plurality of external apparatuses, the image forming apparatus comprising:
   a job reception portion configured to receive from each of the external apparatuses a request to execute a print job for forming an image on a paper sheet;
   an image forming portion configured to form an image on a paper sheet;
   a paper sheet discharge portion, to which a paper sheet on which an image has been formed by the image forming portion is discharged;
   a discharge portion configured to discharge to the paper sheet discharge portion a paper sheet on which an image has been formed by the image forming portion;
   a print control portion configured to perform a printing process for causing the image forming portion to form an image on a paper sheet based on the print job received by the job reception portion, and causing the discharge portion to discharge to the paper sheet discharge portion the paper sheet on which the image has been formed by the image forming portion based on the print job;
   a discharge detection portion configured to detect presence or absence of a paper sheet in the paper sheet discharge portion;
   a person detection portion configured to detect presence or absence of a person within a predetermined distance from the image forming apparatus;
   a history deletion portion configured to, when the person detection portion has not detected the presence of a person, delete job history information stored in a storage portion when the discharge detection portion has not detected the presence of a paper sheet, and wait for the person detection portion to detect the presence of a person again without deleting the job history information stored in the storage portion when the discharge detection portion has detected the presence of a paper sheet;

a collection determination portion configured to, after the person detection portion has detected the presence of a person, when the person detection portion has not detected the presence of a person and the discharge detection portion has not detected the presence of a paper sheet, determine that all paper sheets discharged to the paper sheet discharge portion have been collected;

a display portion configured to display information;

a history storage control portion configured to, every time the printing process is performed, perform a history storage process for storing, in the storage portion, job history information including job identification information identifying the print job based on which the printing process has been performed;

a history display control portion configured to perform a history display process for displaying on the display portion the job identification information included in the job history information stored in the storage portion; and a history display instruction reception portion configured to receive an input of an instruction to cause the history display control portion to perform the history display process;

wherein the history deletion portion is configured to, when the collection determination portion has determined that all paper sheets discharged to the paper sheet discharge portion have been collected, delete the job history information stored in the storage portion.

2. The image forming apparatus according to claim 1, further comprising a deletion instruction reception portion configured to receive an input of job identification information to be deleted from the job identification information displayed on the display portion, wherein
when the deletion instruction reception portion has received the job identification information to be deleted, the history deletion portion deletes the job history information including the received job identification information from the storage portion, and thereafter causes the history display control portion to execute the history display process.

3. The image forming apparatus according to claim 2, wherein
in the history storage process, the history storage control portion stores in the storage portion the job history information so as to further include image data representing an image to be formed on a paper sheet in the print job identified by the job identification information, and
in the history display process, the history display control portion displays the job identification information included in the job history information, and the image represented by the image data included in the job history information in association with each other on the display portion.

4. The image forming apparatus according to claim 1, wherein
in the history storage process, the history storage control portion stores in the storage portion the job history information so as to further include image data representing an image to be formed on a paper sheet in the print job identified by the job identification information, and
in the history display process, the history display control portion displays the job identification information included in the job history information, and the image represented by the image data included in the job history information in association with each other on the display portion.

5. An image forming method to be executed by an image forming apparatus connected to a plurality of external apparatuses,
the image forming method comprising:
a step of performing a printing process for causing an image forming portion of the image forming apparatus to form an image on a paper sheet based on a request from an external apparatus to execute a print job received by a job reception portion, and causing a discharge portion to discharge to a paper sheet discharge portion the paper sheet on which the image has been formed by the image forming portion based on the print job;
a step of, after a person detection portion has detected a presence of a person, within a predetermined distance of the image forming apparatus, when the person detection portion has not detected the presence of the person within the predetermined distance of the image forming apparatus and a discharge detection portion has not detected the presence of a paper sheet in the paper sheet discharge portion, determining that all paper sheets discharged to the paper sheet discharge portion have been collected;
a step of, when the person detection portion has not detected the presence of the person within the predetermined distance of the image forming apparatus, a history deletion portion deletes a job history information stored in a storage portion when a discharge detection portion has not detected the presence of the paper sheet, and waits for the person detection portion to detect the presence of the person again without deleting the job history information stored in the storage portion when the discharge detection portion has detected the presence of the paper sheet;
a step of, every time the printing process is performed, performing a history storage process for storing, in the storage portion, job history information including job identification information identifying the print job based on which printing process has been performed;
a step of performing a history display process for displaying on a display portion of the image forming apparatus the job identification information included in the job history information stored in the storage portion;
a step of receiving an input of an instruction to perform the history display process; and
a step of, when it has been determined that all paper sheets discharged to the paper sheet discharge portion have been collected, deleting the job history information stored in the storage portion.

6. The image forming method according to claim 5, further comprising a step of receiving an input of job identification information to be deleted from the job identification information displayed on the display portion, wherein
when the job identification information to be deleted has been received, the job history information including the received job identification information is deleted from the storage portion, and thereafter the history display process is executed.

7. The image forming method according to claim 6, wherein
in the history storage process, the job history information is stored in the storage portion so as to further include image data representing an image to be formed on a paper sheet in the print job identified by the job identification information, and in the history display process, the job identification information included in the job history information, and the image represented by the image data included in the job history information are displayed in association with each other on the display portion.

8. The image forming method according to claim 5, wherein in the history storage process, the job history information is stored in the storage portion so as to further include image data representing an image to be formed on a paper sheet in the print job identified by the job identification information, and in the history display process, the job identification information included in the job history information, and the image represented by the image data included in the job history information are displayed in association with each other on the display portion.

* * * * *